Figure 1:
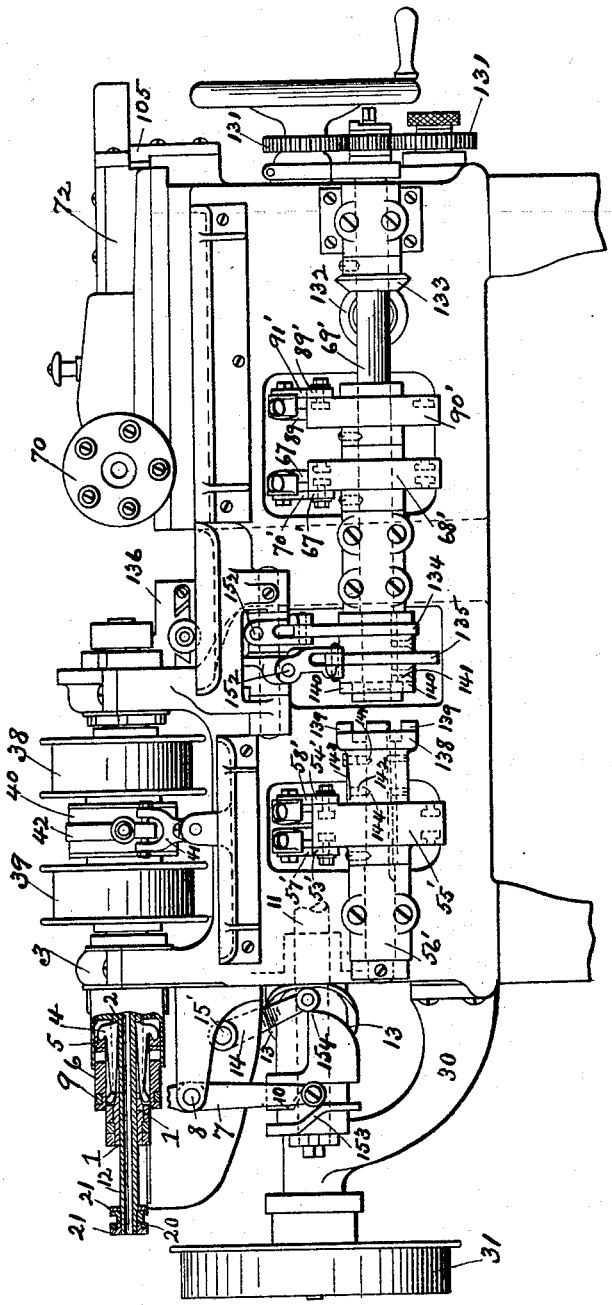

(No Model.)
6 Sheets—Sheet 1.

W. S. DAVENPORT.
METAL SCREW MACHINE.

No. 604,306.　　　　　　　　　Patented May 17, 1898.

WITNESSES.　　　　　　　　　INVENTOR.

(No Model.)   
6 Sheets—Sheet 2.

W. S. DAVENPORT.
METAL SCREW MACHINE.

No. 604,306.  Patented May 17, 1898.

WITNESSES.  
Charles T. Hannigan  
R. A. Bates

INVENTOR.  
William S. Davenport  
By Wilmarth H. Thurston  
Atty.

THE NORRIS PETERS CO., PHOTO-LITHO., WASHINGTON, D. C.

(No Model.)

6 Sheets—Sheet 3.

W. S. DAVENPORT.
METAL SCREW MACHINE.

No. 604,306. Patented May 17, 1898.

WITNESSES.
Charles T. Hannigan
R. A. Bates

INVENTOR.
William S. Davenport,
by Wilmarth H. Thurston,
Atty.

(No Model.) 6 Sheets—Sheet 4.

W. S. DAVENPORT.
METAL SCREW MACHINE.

No. 604,306. Patented May 17, 1898.

WITNESSES. INVENTOR.
Charles T. Hannigan William S. Davenport,
R. A. Bates By Wilmarth H. Thurston,
Atty.

(No Model.)  6 Sheets—Sheet 5.

W. S. DAVENPORT.
METAL SCREW MACHINE.

No. 604,306. Patented May 17, 1898.

WITNESSES.  INVENTOR.
Charles T. Hannigan  William S. Davenport,
R. A. Bates  by Wilmarth H. Thurston,
  Atty.

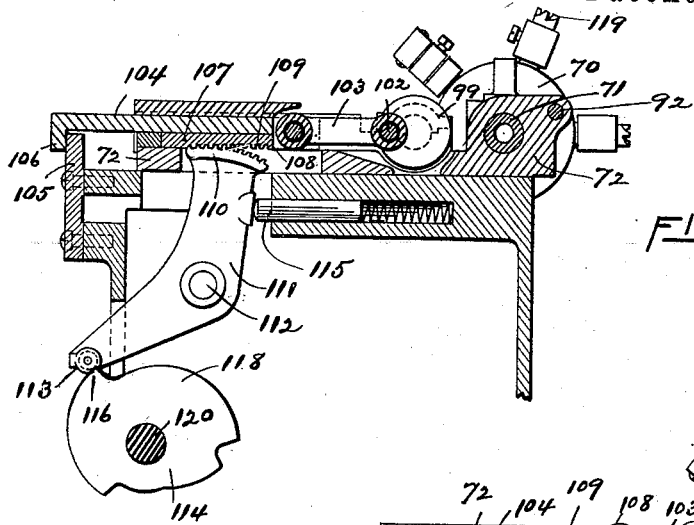
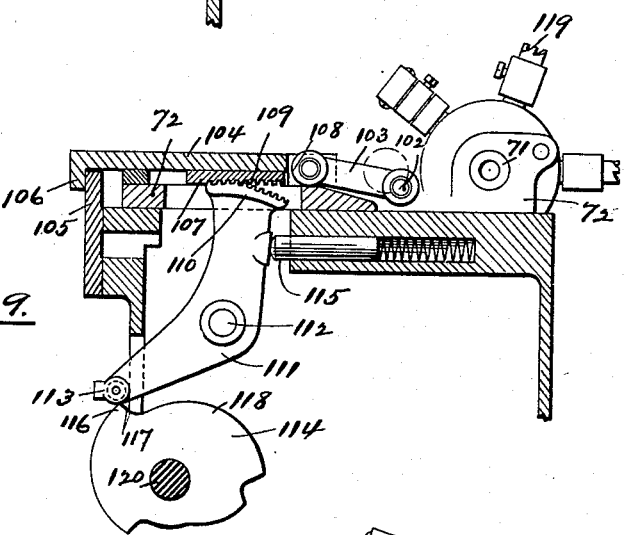
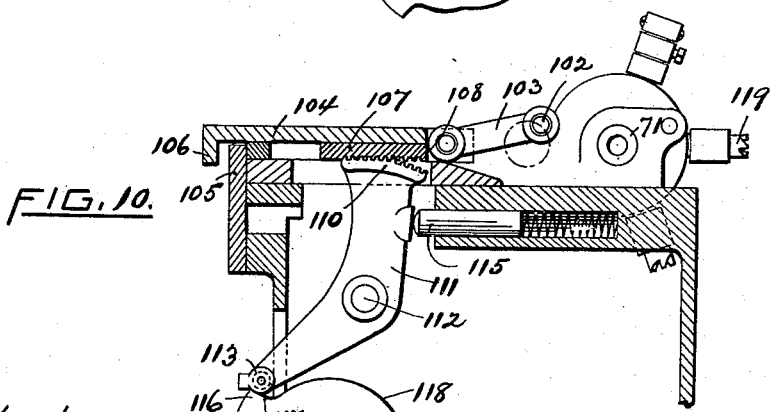

UNITED STATES PATENT OFFICE.

WILLIAM S. DAVENPORT, OF PROVIDENCE, RHODE ISLAND, ASSIGNOR TO THE BROWN & SHARPE MANUFACTURING COMPANY, OF SAME PLACE.

METAL-SCREW MACHINE.

SPECIFICATION forming part of Letters Patent No. 604,306, dated May 17, 1898.

Application filed October 4, 1897. Serial No. 653,950. (No model.)

*To all whom it may concern:*

Be it known that I, WILLIAM S. DAVENPORT, of the city and county of Providence, State of Rhode Island, have invented certain new and useful Improvements in Metal-Screw Machines; and I do hereby declare the following specification, taken in connection with the accompanying drawings, forming a part of the same, to be a full, clear, and exact description thereof.

The present improvements relate to screw-machines, and more especially to that class of screw-machines in which a rod of stock is intermittently fed forward for the prescribed distance to form an article and is held by the jaws of a revolving chuck and successively acted on by a series of tools carried by a tool-holder.

One feature of invention relates to means for reducing to a minimum the time which elapses between the operation of successive tools; and it consists in providing two independent mechanisms for effecting the reciprocation of the support which carries the series of tools, which support preferably consists of a turret mounted on a turret-slide, one of said mechanisms acting to slowly advance the support during the cutting and the other mechanism acting to quickly return the support to its rearward position. In case the machine is forming short articles the support must be advanced some distance before the tools begin to act upon the stock, and it is therefore preferred to so construct the mechanism for rapidly returning the support that it may also bring the tools up to the work. With such a construction the support may be returned, indexed, and again advanced to bring the succeeding tool up to the work while the slow-running mechanism is moving into position to again feed forward the support and the rapidity of the operation and efficiency of the machine thus increased. For thus reciprocating the turret-slide at a rapid rate during a part of its movement and at a comparatively slow speed during another part of its movement a mechanism is preferably used which is novel in itself and forms a further feature of invention.
Further features of invention relate to the indexing mechanism, the mechanism for reversing the chuck-spindle, the mechanism for feeding the stock, and other combinations and constructions which will be more fully set forth hereinafter and specified in the claims.

Figure 2:
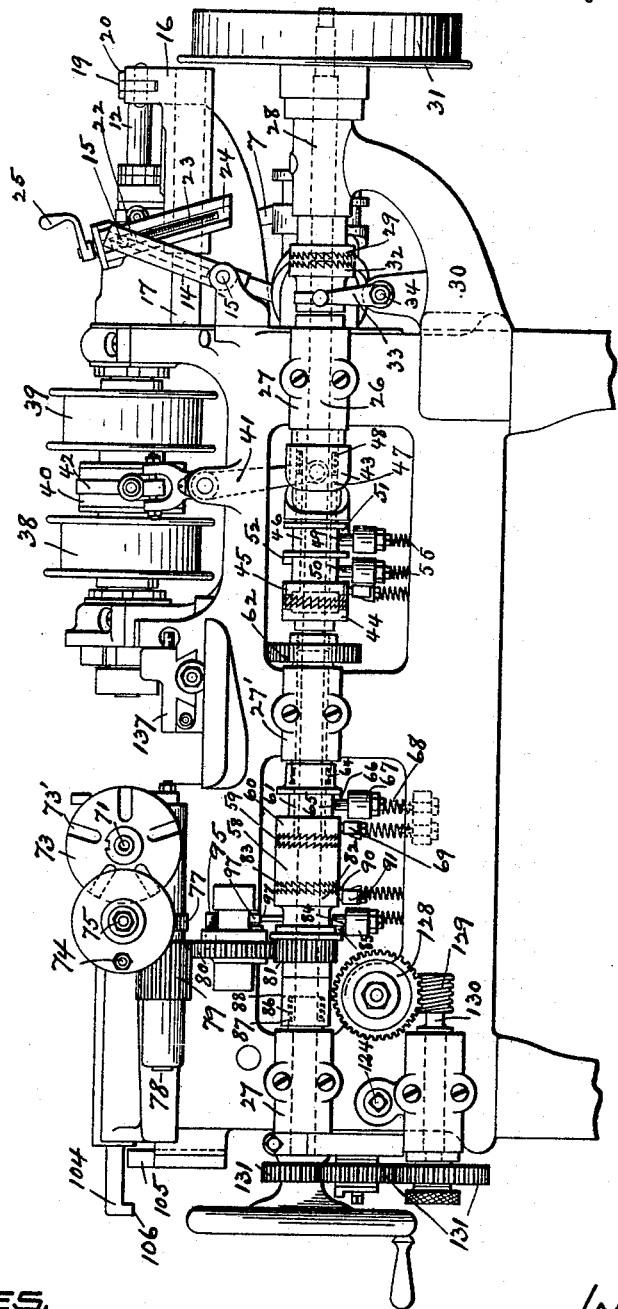
Figure 3:
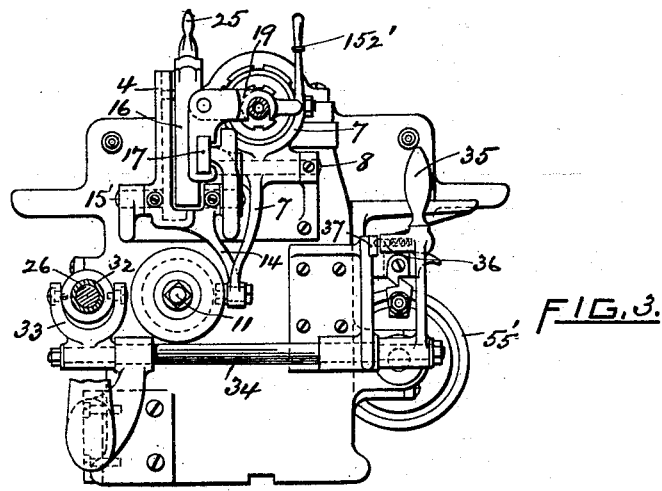
Figure 4:
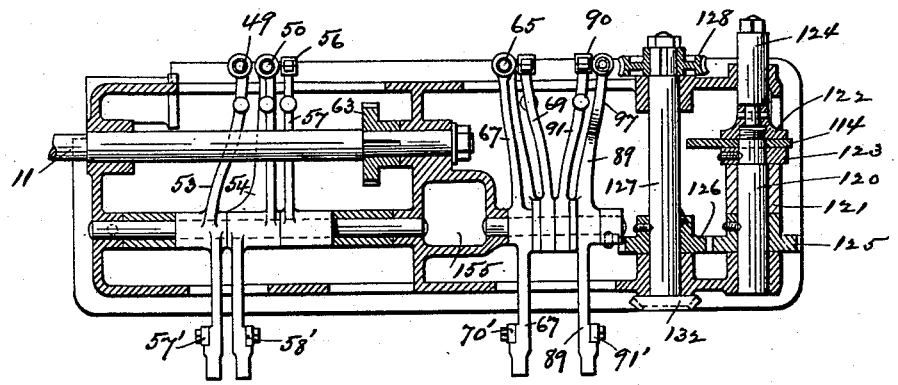
Figure 5:
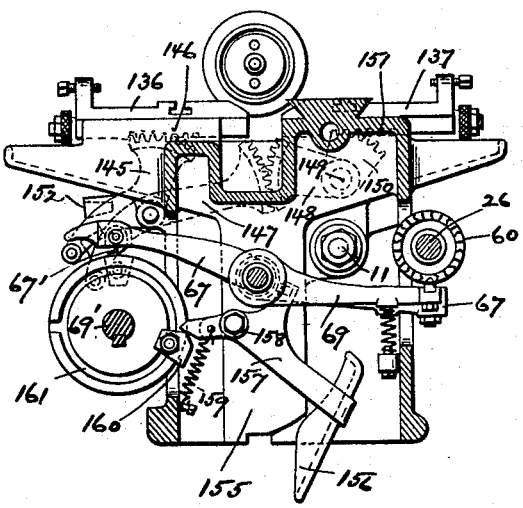
Figure 11:
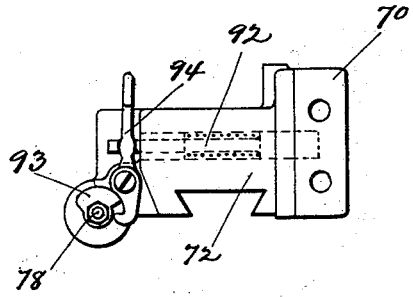
Figure 6:
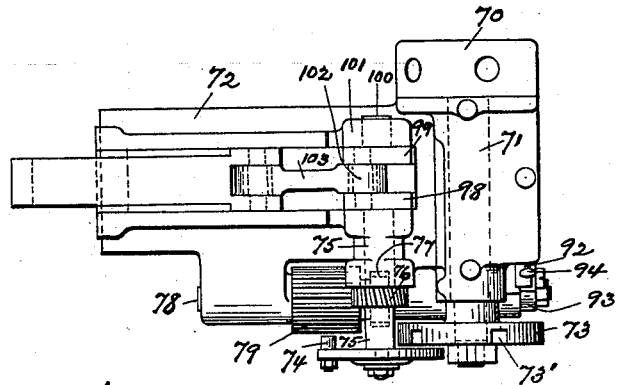
Figure 7:
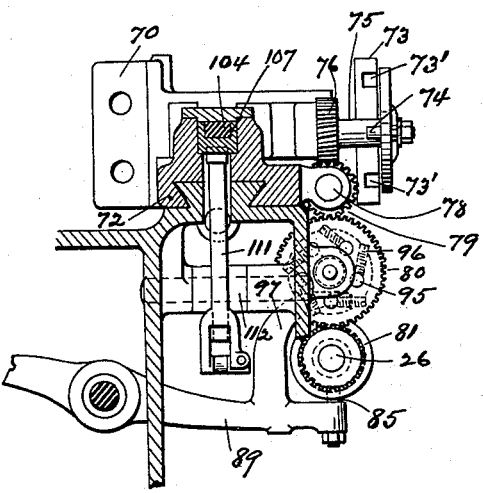

In the accompanying drawings, in which is illustrated a screw-machine embodying the present improvements in their preferred form, Figure 1 is a front elevation. Fig. 2 is a rear elevation. Fig. 3 is an elevation of the left-hand end of the machine. Fig. 4 is a horizontal sectional view with the back and front shaft removed. Fig. 5 is a transverse sectional view. Fig. 6 is a detail plan view of the turret-slide and the parts carried thereby. Fig. 7 is a detail sectional elevation of the same. Figs. 8, 9, and 10 are longitudinal sectional views of the same, showing the parts in different positions. Fig. 11 is an end view of the turret-slide.

The construction of the chuck-carrying spindle 1 is substantially like the chuck-spindle shown and fully described in the patent to S. L. Worsley, granted July 30, 1895, with the exception that in the present machine the spindle and the sleeve 2, which operate the jaws of the chuck, extend beyond the rear bearing 3, and the levers 4 and the sleeve 5, against which said levers bear, are mounted outside the rear bearing instead of adjacent the front bearing, as in the patent referred to. The levers 4 are operated by a sliding sleeve 6, as in said patent, and said sleeve is operated by a lever 7, pivoted at 8 and provided with a yoke at its upper end, the arms of which are pivoted to a collar 9, mounted in a groove in said sleeve 6. The lower end of lever 7 carries a roll which is engaged by a cam 10, secured to a cam-shaft 11, which is revolved at the proper times to open and close the jaws of the gripper.

The stock is fed forward by means of the feeding-tube 12, which is provided with the usual spring-fingers for engaging the stock and which is reciprocated at the proper time by mechanism actuated from a cam 13, secured to the cam-shaft 11. This mechanism, which forms a feature of the present invention, is so constructed that the amount of stock fed may be varied without producing lost motion in the connections, with the result that a more accurate and more efficient feed of the stock is effected. In the embodiment of this feature of invention (shown in the drawings) a lever 14 is pivoted at 15' and is given a definite throw by the cam 13, which acts upon a roll on the end of said lever. The lever 14 is provided with a groove in its upper end, which is engaged by a stud 15, adjustably mounted on a slide 16. The slide 16 is guided upon suitable ways 17, formed on the bracket 18, and is connected with the feed-tube 12 by means of a pivoted arm 19, which fits in a groove in the collar 20, loosely mounted between shoulders 21 on the feed-tube. The stud 15 is formed on a nut 22, which is engaged by a screw-rod 23 on the slide 16, and is guided in a groove 24, formed in said slide. A handle 25 may be placed on the squared end of the rod 23 and said rod turned to adjust the stud 15 to and from the pivot of the lever 14, and thus vary the distance through which the slide and feeding-tube are moved by the oscillation of the lever. The grooves in the slide and lever are so arranged that they are parallel when the lever is at the forward limit of its throw, so that the end of the feeding-tube moves up to the same point without regard to the amount of stock fed.

The various mechanisms of the machine, with the exception of the spindle, are driven from a shaft 26, mounted in bearings 27, secured to the back of the frame and connected to a short shaft 28 by means of a clutch 29. The shaft 28 is mounted in the bracket 30 and carries a band-pulley 31 at its outer end, to which power may be applied. One member of the clutch 29 is secured to the shaft 28 and the other member 32 is keyed to slide upon the end of shaft 26. The clutch member 32 may be shifted to stop the operation of the automatic mechanisms by means of a yoke 33, the arms of which are pivoted to a ring on said member, said yoke being secured to a shaft 34, extending transversely of the machine, and provided with a handle 35 at its front end. The handle 35 carries a spring-pressed pin 36, which engages notches in a plate 37 and serves to hold the clutch member 32 in or out of engagement.

The spindle is rotated in either direction by means of two oppositely-running pulleys 38 and 39, loosely mounted on said spindle and which may be alternately connected to the spindle by means of a clutch operated by the sleeve 40 in any well-known manner. The sleeve 40 is shifted to connect either the pulley 38 or 39 to the shaft by means of a lever 41, which is provided with a yoke at its upper end, the arms of which are pivoted to the ring 42, loosely mounted in a groove in said sleeve. The shifter-lever 41 is operated in each direction by a cam 43, which is revolved a half-revolution at suitable intervals to shift the sleeve 40 first in one direction and then in the other, and thus reverse the direction of rotation of the spindle. The cam 43 is driven from the driving-shaft 26 by the following mechanism: A clutch member 44 is secured to the shaft 26 and is engaged at intervals by a clutch member 45, connected to the cam 43, said clutch members coöperating to form a driver for said cam. A sleeve or bushing 46 surrounds the shaft 26 between the clutch member 44 and the bearing 27 and the clutch member 45 is loosely mounted on this sleeve. The clutch member 45 is provided with a hub 47, which extends within the cam 43 and to which the cam is keyed, so that said cam will be revolved with said clutch member while allowing a longitudinal movement thereof. A spring 48 is interposed between the end of the hub 47 and a shoulder on the sleeve 46 and tends to force the clutch member 45 into engagement with clutch member 44. The clutch member 45 is normally held out of engagement by one or the other of two abutments 49 50, which engage one or the other of cams 51 and 52, formed on the said clutch member, said cams being located on diametrically opposite sides of the clutch member. The abutments 49 and 50 are in the form of pins on the ends of levers 53 and 54, which extend transversely of the machine and are operated at the proper times by means of tappets 53' and 54', adjustably secured in undercut grooves formed in a disk 55', secured to a shaft 56' at the front of the machine. The arms 53 and 54 are provided with plates 57' and 58', against which the tappets act, and said arms are also provided with handles on their ends, whereby they may be tripped by hand, if desired. With the parts in the position shown in Fig. 2 the clutch member 45 is held out of engagement by the abutment 49, which engages the cam 51. When the lever 54 is rocked, the member 45 is released and the spring 48 forces the said member into engagement with the revolving member 44 and the cam 43 is revolved until the cam 52 engages the abutment 50, when the clutch member 44 is again thrown out of engagement and held until the arm 53 is rocked and the clutch member again released. The levers 53 and 54 are returned immediately after being rocked by springs 55 and the pins ride on the periphery of the clutch member until engaged by the cams. A pin 56 on the end of a spring-pressed arm 57 engages notches in the periphery of the clutch member 45 and prevents overrunning of the cam 43 and holds the cam in position. While it is preferred to employ two abutments, as with such a construction the clutch may be run at a higher rate of speed and the rotation of the spindle be reversed in more rapid succession, yet it will be understood that a single abutment may be used, if desired, in which case the cams 51 and 52 will both be arranged to engage said abutment.

The cam-shaft 11 is revolved a single revolution at the proper time to open and close the chuck-jaws and to feed forward a new length of stock by the following mechanism:

A collar 58, secured to the shaft 26, is provided with a clutch-face 59, arranged to be engaged by a clutch member 60, keyed to slide upon a sleeve 61, which extends through the bearing 27' and has a gear 62 secured to its end. The gear 62 meshes with a similar gear 63, secured to the cam-shaft 11. A spring 64 is interposed between a shoulder on the sleeve 61 and a shoulder on the clutch member 60 and tends to force said member into engagement with the clutch-face 59. The clutch member 60 is held out of engagement by means of an abutment 65, which engages a cam 66, formed on the said clutch member. The abutment 65 is in the form of a pin on the end of a lever 67, extending transversely of the machine and rocked against the action of spring 68 at the proper time by means of one or more tappets 67', adjustably secured in an undercut groove formed in a disk 68', secured to a shaft 69', mounted in bearings at the front of the machine. The arm 67 is provided with a plate 70', which is engaged by the tappet 67', and said arm is also provided with a handle whereby it may be operated by hand. When the lever 67 is rocked, the clutch member 60 engages the clutch-face 59 and said member is revolved one revolution, when the cam 66 engages the abutment 65 and disengages the clutch member. A pin on the end of a spring-pressed arm 69 engages a notch in the periphery of clutch member 60 and prevents overrunning of the clutch member and parts driven thereby.

A turret 70 is secured to a shaft 71, mounted in a turret-slide 72 and forms a support for a series of tools for acting upon the stock carried by the spindle. The turret is indexed—that is to say, is moved to bring the tools successively into position to act on the stock by mechanism carried by the turret-slide, which indexing mechanism is driven intermittently by mechanism mounted on the frame and connected with the indexing mechanism by gearing which does not interfere with the reciprocation of the slide. The indexing mechanism consists of a disk 73, connected with the turret, preferably, by being secured to the shaft 71, and provided with radial slots 73', arranged to be engaged by a crank-pin 74, also mounted on the turret-slide. The crank-pin 74 is carried by a disk secured to a shaft 75, journaled in the slide 72 and having a spiral gear 76 secured thereto, which gear is engaged by a spiral gear 77, secured to a shaft 78, extending longitudinally of the slide 72. A gear 79 is secured to the shaft 78, and is engaged by a gear 80, mounted on the frame of the machine, the gear 79 being of such length that the slide 72 may be reciprocated without disengaging the said gear and gear 80. The gear 80 is engaged by a gear 81, loosely mounted on the shaft 26. The gear 81 is intermittently revolved by a clutch member 82, which is secured thereto or formed integral therewith, and is normally held out of engagement with a clutch-face 83 on the collar 58 by an abutment 84, which engages a cam 85 on said clutch member. The clutch member is forced toward the collar 58 by a spring 86, interposed between a shoulder 87 on the shaft 26 and the end of a recess formed in a sleeve 88, which bears against the hub of gear 81. The abutment 84 is in the form of a pin in the end of a lever 89, which extends transversely of the machine, and is rocked at the proper time by means of a series of tappets 89', (one only of which is shown adjustably secured in an undercut groove in a disk 90', secured to the shaft 69'.) The arm 89 is provided with a plate 91', engaged by the tappets 89', and with a handle whereby said arm may be rocked by hand. When the lever 89 is rocked, the clutch member is revolved a single revolution and then thrown out, as above described with reference to clutch member 60. A pin 90 on the end of a spring-pressed lever 91 engages a notch in the periphery of the clutch member 82 and prevents said member overrunning. When the clutch member 82 is revolved, it acts through the gearing described to rotate the shaft 75 a single revolution and causes the crank-pin 74 to engage one of the slots 73' and move the turret-head a partial revolution. The slots 73' in the disk 73 are so arranged that the crank will enter and leave said slots while moving radially of the disk 73, and the turret will thus be gradually started and stopped, and may be indexed quickly without any jar either in starting or stopping. Moreover, with this construction of indexing mechanism the turret may remain locked until the crank enters a slot 73' and may be again locked just before the crank leaves the slot, and thus accuracy of indexing may be insured, since the turret is positively held at all times. By mounting the indexing mechanism on the turret-slide and driving said mechanism from a driver on the frame which is always connected with said indexing mechanism it is not necessary to move the slide into any fixed position to effect the indexing, but said indexing may take place with the slide in any position, or while the slide is moving in either direction.

The turret is locked in position by a spring-pressed locking-bolt 92, which engages recesses formed in said turret. The bolt 92 is withdrawn just after the crank-pin 74 enters one of the slots 73' and released just before said crank leaves said slot by means of a cam 93, secured to the end of shaft 78, which cam acts upon the end of a lever 94, engaging said bolt.

As shown in the drawings, the turret is constructed to carry five tools, and in case five tools are used five tappets 89' will be used and the turret-slide will be advanced after each indexing. In case a fewer number of tools are used it is desirable that the turret should be indexed two or more times in rapid succession after it has been returned and before the next cutting operation takes place.

This may be accomplished by placing two or more of the tappets 89' close to each other, so that the abutment 84 will be tripped two or more times in rapid succession, and the driving-clutch 82 will be thrown into action two or more times in rapid succession; but it is preferred to provide means for holding or moving the abutment out of operative position as the cam 85 passes said abutment, so that the driver 82 is not thrown out of action until it has revolved two or more times, according as there are four or a less number of tools being used. This feature of the invention in its preferred form consists of a series of adjustable slides or other suitable devices which may be moved into or out of operative position and which when in operative position will hold the abutment 84 out of the path of the cam 85. As shown in the drawings, these devices are in the form of a series of five pins 95, mounted to slide in the gear 80 and held in position by the set-screws 96. When adjusted to project beyond the gear, these pins engage a branch 97 of the arm 89 and hold the abutment 84 out of the path of the cam 85. Thus the driver for the indexing mechanism may be caused to remain in engagement for two or more revolutions, according as one or more of the pins 95 projects beyond the gear 80.

In machines in which the turret-slide is reciprocated by means of a cam said cam must run at a slow speed in order that the tools may act upon the stock properly during the cutting, and when the roll which engages the cam reaches a high point of the cam and the cutting operation is completed the cam must revolve far enough to allow the roll to roll over such high point before the return movement of the slide begins, and must then pass low enough to bring the slide to its rearward position before the indexing can begin, and then the indexing must take place and the tool be brought up to the work before the cutting can begin. In such a construction there is considerable time consumed in thus returning, indexing, and bringing the tools up to the work, especially when the machine is forming short articles. It is therefore preferred to use a slow-running cam for advancing the turret-slide during the cutting and to provide independent and more-rapidly-acting mechanism for returning the turret-slide, and it is also preferred to so construct this mechanism that it will also advance the turret-slide to bring the tools up to the work. With such a construction the turret-slide is returned, the turret indexed, and the turret-slide advanced to bring the succeeding tool up to the work while the roll is passing over the high point of the cam and passing low enough to bring it into proper position to operate the turret-slide during the cutting operation, and the rapidity of operation is thereby increased. Any suitable mechanism may be used to thus return the turret-slide, but it is preferred to use a mechanism which is carried by the turret-slide, and it is also preferred to drive said mechanism from the indexing mechanism.

The mechanism for reciprocating the turret-slide forms a feature of the present invention which is not limited in its application to screw-machines, but may be used in other relations for producing a reciprocating movement. The preferred form of such mechanism is shown in Figs. 6 to 10 and is as follows: A disk 98 is secured upon the end of shaft 75, and a corresponding disk 99 is secured to the end of a stud 100, mounted in a bearing 101 upon the slide 72, the axes of said stud and shaft being in line. A crank-pin 102 connects said disks and passes through one end of a link 103, the other end of which is pivotally connected to a bar or block 104, mounted to slide upon the slide 72. An abutment or stop 105, secured to the frame, is arranged to engage the end 106 of the bar 104. A reciprocating member in the form of a block 107, U-shaped in cross-section, is mounted upon the slide 72, the arms of the U extending upon opposite sides of the bar 104 and the end of said block being engaged by the shoulder 108 upon the block 104. The block 107 is provided with rack-teeth 109, which are engaged by a segmental gear 110, forming one arm of a lever 111, pivoted at 112 and carrying a roll 113 at its other end. The roll 113 rides on the surface of a cam 114, being held thereon by a spring-pressed bolt 115, which engages the lever 111. The operation is as follows: During the cutting operation the crank 102 and link 103 stand in the position shown in Fig. 8 and rigidly connect the bar 104 and the slide 72. The block 107 engages the shoulder 108 on the bar 104, and as the roll 113 rides up one of the lobes of the cam 114 the block 107, acting through said connections, advances the slide 72. When the cutting is completed, the parts will stand in the position shown in Fig. 8, with the bar 104 engaging the stop 105 and the roll 113 upon the point 116 of the cam 114. The abutment 84 will now be tripped and the shaft 75 revolved a single revolution. As the shaft revolves into the position shown in Fig. 9 the crank 102 will act, through the link 103, bar 104, and stop 105, to draw back the slide 72 and draw the tool off the stock. In the meantime the roll 113 will roll over the point 116 of the cam 114, and the block 107 will slowly move back away from the shoulder 108. As the shaft 75 continues to revolve the crank 74 will enter one of the slots 73' and turn the turret 70 to bring the next tool into position. At the completion of the indexing the parts will occupy the position shown in Fig. 10. When the crank 102 is diametrically opposite its normal position, the return of the slide 72 will have been completed, and as the crank continues to revolve the bar 104 will be moved back away from the stop 105. During this time the roll 113 has been passing down the incline 117 of the cam 114 and the block 107 has been moving back. As the crank 102 completes its revolution the roll reaches the low part of the cam and starts up the succeeding lobe 118. In case short articles are being formed the backward movement of the block 107 is only a fraction of the backward movement of the slide 72, and during the latter part of the rotation of the crank 102 the shoulder 108 will therefore bear against the end of block 107, and the slide 72 will be advanced by the action of the crank and bar 104. When the crank has completed its revolution, the slide 72 will have been advanced to bring the tool 119 up to the work, and said tool will then be advanced along the stock by the action of the slow-running cam 114. Thus the turret-slide will be advanced during the cutting by a slow-running mechanism and will be returned and advanced to bring the tools up to the work by a quick-running mechanism and the time required to make the changes between successive cuts reduced to a minimum and the efficiency of the machine thereby increased.

While it is preferred to mount the parts of the return mechanism upon the slide, as by such an arrangement a compact construction is provided, it will be understood that the invention is not limited to such an arrangement, but that the parts may be otherwise arranged, if desired.

The cam 114 is secured upon the end of a shaft 120, mounted in the bearing 121, said cam being held upon said shaft by means of a nut 122, which screws upon the end of the shaft and clamps said cam against a disk 123. The nut 122 is provided with a shank 124, which extends beyond the frame of the machine and is provided with a squared end to receive a wrench. A gear 125 is secured to the shaft 120 and is engaged by a gear 126, secured to a second cross-shaft 127, which carries a worm-wheel 128, keyed to its end outside the frame and engaged by a worm 129, formed on a shaft 130. The shaft 130 is driven from the shaft 26 by a series of change-gears 131.

The front shaft 69' is driven from the shaft 127 by means of a bevel-gear 132, secured to the end of shaft 127, which engages a bevel-gear 133, secured to the shaft 69'. The shaft 69' also has secured thereto the cams 134 and 135 for operating the cross-slides 136 and 137. These cams are mounted upon the end of shaft 69' outside its bearing, so that said cams may be readily changed. The shaft 56' is in line with shaft 69' and is connected thereto by a coupling 138, which is arranged to slide on the shaft 56' to allow the removal of the cams 134 and 135. The coupling 138 is provided with projections 139, which are arranged to engage recesses 140 in a collar 141, secured to the end of shaft 69', and said coupling is connected to the shaft 56' by means of a spline and groove, so that said coupling may be moved longitudinally of said shaft. A pin 142, secured to a leaf-spring 143, is carried by the coupling, and two recesses 144 are formed in the shaft 56' in position to be engaged by said pin, one of said holes being engaged by the pin when the coupling is in engagement with the collar 141 and the other being engaged when the coupling is slid back, as shown in Fig. 1.

The cross-slide 136 is operated from the cam 134 by means of a lever 145, provided with gear-teeth which engage a rack 146 on the cross-slide. The cross-slide 137 is operated from the cam 135 by means of a lever 147, which engages a segmental gear 148, secured to a shaft 149, which shaft carries a second segmental gear 150, which engages a rack 151 on the slide 137. Both of the levers 145 and 147 extend to the front of the machine and overlie their operating-cams and are provided with sockets 152 for the reception of handles for manually operating the cross-slides.

When a rod of stock is used up and it is desired to insert a new rod of stock, the operation of the parts of the machine other than the spindle must be stopped for this purpose, and the jaws of the chuck must be opened to receive the new rod of stock. In the present machine means are provided for manually opening the jaws of the chuck and at the same time throwing the driver for the cam-shaft into engagement, so that when the machine is started up the jaws of the chuck will be closed and the feed mechanism moved into position to feed forward the stock when the cam-shaft is again revolved. The jaws of the chuck are manually opened by moving the lever 7 by means of a handle 152', attached to said lever. A cam 153 is secured to the shaft 11 and is arranged to be acted on by the roll on the end of lever 7 when said lever is rocked to open the jaws of the chuck. The action of this roll on the cam turns the shaft 11 slightly and thus, through the gears 62 and 63, turns the clutch member 60 far enough to carry the cam 66 past the abutment 65 and allow said clutch member to move into engagement with the clutch-face 59. This movement of the shaft 11 also brings the point 154 of cam 13 past the roll on the end of lever 14, so that the said lever is free to swing forward when the rod of stock is inserted. Now when the machine is started the shaft 11 completes its revolution and the jaws of the chuck are closed and the feeding-tube moved back ready to feed forward a new portion of stock.

The chips formed by the cutting-tools, as well as the completed articles formed by the action of the various tools and severed from the end of the rod of stock, pass down through a chute 155, passing down through the frame of the machine, and means are provided for separating the articles from the chips, which consists of a deflector-plate which normally stands out of the path of the chips, but which is moved into the path of the chips just as the article is severed and deflects said article. This plate 156 is secured to the end of a lever 157, which is pivoted at 158 and held in normal position by the spring 159. Just as the article is severed the end of the lever 157 is engaged by a cam 160, adjustably secured in an undercut groove 161 in the disk 68', and is swung across the path of the chips. The articles falling down the chute 155 strike the plate 156 and are deflected into a receptacle placed to receive them.

The general operation of the machine will be understood from the detail description of the operation of the various parts as above set forth.

What I claim as my invention, and desire to secure by Letters Patent, is—

1. The combination of a support for a plurality of tools, of mechanism for indexing said support, mechanism for advancing said support, and independent mechanism for returning said support, substantially as described.

2. The combination of a support for a plurality of tools, of mechanism for indexing said support, a cam for advancing said support, and mechanism independent of said cam for returning said support, substantially as described.

3. In a screw-machine, the combination with the turret-slide, of mechanism for advancing said slide, and independent mechanism for returning said slide, substantially as described.

4. In a screw-machine, the combination with the turret-slide, of a cam for advancing said slide, and mechanism independent of said cam for returning said slide, substantially as described.

5. In a screw-machine, the combination with the turret-slide, a turret mounted thereon and mechanism for indexing the same, of mechanism for advancing said slide, and independent mechanism for returning said slide, substantially as described.

6. In a screw-machine, the combination with a turret-slide, a turret mounted thereon and mechanism for indexing said turret, of mechanism for moving said slide during the cutting, and independent mechanism for moving said slide during the non-cutting movement, substantially as described.

7. In a screw-machine, the combination with a turret-slide, a turret mounted thereon and mechanism for indexing said turret, of a continuously-moving cam for advancing said slide, and intermittently-operating mechanism for returning said slide, substantially as described.

8. In a screw-machine, the combination with a turret-slide, of mechanism for advancing said slide, and mechanism carried by said slide for returning the same, substantially as described.

9. In a screw-machine, the combination with a turret-slide, of a cam for advancing said slide, and mechanism carried by said slide for returning the same, substantially as described.

10. In a screw-machine, the combination with a turret-slide, a turret-head mounted thereon, and mechanism for indexing the same, of mechanism for advancing said slide, and mechanism carried by said slide and driven from the indexing mechanism for returning said slide, substantially as described.

11. In a screw-machine, the combination with a turret-slide, a turret mounted thereon, and mechanism for indexing said turret, of a reciprocating member, a bar connected with said slide for engaging said member, means for intermittently causing a relative reciprocating movement between said bar and turret-slide, and a stop for said bar, substantially as described.

12. In a screw-machine, the combination with a turret-slide, a turret mounted thereon and mechanism for indexing said turret, of a block, a cam and connections for reciprocating said block, a bar connected with said slide for engaging said block, a stop for said bar, and means for intermittently causing a relative reciprocating movement between said turret-slide and bar, substantially as described.

13. In a screw-machine, the combination with a turret-slide, a turret mounted thereon, and mechanism for indexing said turret, of a block, means for reciprocating said block, a bar for engaging said block, a stop for said bar, a crank on said turret-slide, and means for intermittently rotating said crank substantially as described.

14. In a screw-machine, the combination with a turret-slide, a turret mounted thereon and mechanism for indexing said turret, of a block provided with a rack, a lever provided with a segmental gear engaging said rack, a cam for operating said lever, a bar for engaging said block, a stop for said bar, a crank on said turret-slide connected with said bar, and means for intermittently revolving said crank, substantially as described.

15. In a screw-machine, the combination with a turret-slide, a turret mounted thereon and mechanism for indexing said turret, of mechanism for advancing said turret-slide, and mechanism operated from the indexing mechanism for returning said slide, substantially as described.

16. In a screw-machine, the combination with a turret-slide, a turret mounted thereon and mechanism for indexing said turret, of mechanism for moving said slide during the cutting and mechanism operated from said indexing mechanism for moving said turret-slide during the non-cutting movement, substantially as described.

17. A slide, a reciprocating member, a bar connected with said slide for engaging said member, means for intermittently causing a relative reciprocating movement between said slide and bar, and a stop-bar for said bar, substantially as described.

18. A slide, a block, means for reciprocating said block, a bar for engaging said block, a stop for said bar, a crank on said slide, connected to said bar, and means for intermittently rotating said crank, substantially as described.

19. A slide, a block, a cam and connection for reciprocating said block, a bar connected with said slide for engaging said block, a stop for said bar, and means for intermittently causing a relative reciprocating movement between said bar and slide, substantially as described.

20. A slide, a block provided with a rack, a lever provided with a segmental gear engaging said rack, a cam for operating said lever, a bar connected with said slide for engaging said block, a stop for said bar, and means for intermittently causing a relative reciprocating movement between said bar and slide, substantially as described.

21. A slide, a block provided with a rack, a lever provided with a segmental gear engaging said rack, a cam for operating said lever, a bar for engaging said block, a stop for said bar, a crank on said slide connected with said bar, and means for intermittently rotating said crank, substantially as described.

22. A slide, a rack, guided on said slide, a bar guided on said slide and provided with a shoulder for engaging said rack, a stop for said bar, an oscillating gear engaging said rack, and means for causing a relative reciprocating movement between said bar and slide, substantially as described.

23. A slide, a block guided on said slide, means for reciprocating said block, a bar guided on said slide and engaging said block, a stop for said bar, and means for intermittently causing a relative reciprocating movement between said slide and bar, substantially as described.

24. A slide, a rack guided on said slide, an oscillating gear for operating said rack, a bar guided on said slide for engaging said rack, a stop for said bar, a crank on said slide connected with said bar, and means for intermittently rotating said crank, substantially as described.

25. In a screw-machine, the combination with a turret-slide, and a turret mounted thereon, of mechanism for indexing said turret carried by said slide, a driver for said mechanism mounted on the frame, and gearing between said driver and indexing mechanism, substantially as described.

26. In a screw-machine, the combination with a turret-slide, and a turret mounted thereon, of mechanism for indexing said turret carried by said slide, a shaft extending longitudinally of said slide and connected with said mechanism, a gear on said shaft, a gear mounted on the frame engaging said gear, and means for intermittently revolving the gear on the frame, substantially as described.

27. In a screw-machine, the combination with a turret-slide, and a turret mounted thereon, of a disk connected with said turret and provided with radial slots, a crank on said slide for engaging said slots, and means for intermittently revolving said crank, substantially as described.

28. In a screw-machine, the combination with a turret-slide, and a turret mounted thereon, of a disk connected with said turret-head, and a crank-pin on said turret-slide arranged to enter and leave said slots when moving radially of said disk, substantially as described.

29. The combination with means for engaging the stock, of a slide connected therewith, a lever, an adjustable pivotal connection between said slide and lever, and means for oscillating said lever, substantially as described.

30. The combination with means for engaging the stock, of a slide connected therewith, a lever, a groove in one of said parts, an adjustable stud secured to the other part and engaging said groove, and means for oscillating said lever, substantially as described.

31. The combination with means for engaging the stock, of a slide connected therewith, a lever, a slot in one of said parts, a stud secured to the other lever and engaging said groove, means for adjusting said stud in line with said groove when the lever is at the forward limit of its throw, and means for oscillating said lever, substantially as described.

32. The combination with means for engaging the stock, of a slide, a screw-rod on said slide, a stud engaged by said screw-rod, a lever provided with a groove engaged by said stud, and a cam for oscillating said lever, substantially as described.

33. In a screw-machine, the combination with a turret-head for holding a series of tools, mechanism for indexing said turret-head, a driver for said mechanism, a device for holding said driver out of operation, means for tripping said device to allow the driver to operate, and means for tripping said device to prevent the driver from being thrown out of operation, substantially as described.

34. In a screw-machine, the combination with a turret-head for holding a series of tools, mechanism for indexing said head, a driver for said mechanism, a cam connected with said driver, an abutment in the path of the cam for holding the driver out of operation, means for tripping said abutment to render the driver operative, and means for tripping said abutment to prevent the engagement of the cam and abutment, substantially as described.

35. In a screw-machine, the combination with a turret-head, for holding a series of tools, a clutch-gearing between said clutch and turret-head, a cam on said clutch, an abutment in the path of said cam, means for tripping said abutment, a disk driven from said clutch, and a series of slides carried by said disk for engaging said abutment, substantially as described.

36. In a screw-machine, the combination with a turret-head for holding a series of tools, a clutch, gearing between said clutch and turret-head, a cam on said clutch, an abutment in the path of said cam for holding said clutch out of engagement, means for tripping said abutment, and a series of adjustable devices carried by said gearing for holding said abutment out of the path of said cam, substantially as described.

37. The combination of a clutch, a cam on said clutch, an abutment in the path of said cam, means for tripping said abutment, a disk driven from said clutch, and a series of slides carried by said disk for engaging said abutment, substantially as described.

38. The combination of a clutch, a cam on said clutch, an abutment in the path of said cam, means for tripping the abutment, a disk driven from said clutch, and a series of adjustable pins for engaging said abutment, substantially as described.

39. In a screw-machine, the combination with mechanism for operating the jaws of the chuck embodying a cam, a shaft on which said cam is mounted, a driver for said shaft, means for holding said driver out of operative position, means for manually operating the jaws of the chuck, and simultaneously throwing said driver into operative position, substantially as described.

40. In a screw-machine, the combination with mechanism for operating the jaws of the chuck, of a driver therefor, means for rendering said driver inoperative, and means for manually operating the chuck-jaws and simultaneously rendering said driver operative, substantially as described.

41. In a screw-machine, the combination with the chuck, of mechanism for reversing said chuck, mechanism for operating the chuck-jaws and feeding the stock, a cam-shaft for operating said feeding and jaw-operating mechanism, a turret, indexing mechanism for said turret, a shaft and intermittently-operating drivers on said shaft for operating the reversing mechanism, cam-shaft and indexing mechanism, substantially as described.

42. In a screw-machine, the combination with mechanism for operating the jaws of the chuck embodying a lever, a cam-shaft, a cam on said shaft for operating said lever, mechanism for feeding the stock embodying a lever, a cam on said shaft for operating said lever, a driver for said shaft, and a cam on said shaft engaged by the end of the jaw-operating lever and so arranged that movement of said lever to open the jaws will turn said shaft, substantially as described.

43. The combination of a shifter, a cam for operating said shifter in each direction, a clutch for operating said cam, two cams on said clutch, an abutment in the path of each cam for holding the clutch out of engagement, and means for rendering said abutments inoperative, substantially as described.

44. In a screw-machine, the combination with the spindle, one or more cross-slides, and mechanism for reversing the direction of rotation of the spindle, of a front shaft, one or more cams on the end of said shaft for operating the cross-slides, a second shaft in line with said front shaft provided with means for controlling the reversing mechanism, and a movable coupling between said shaft, substantially as described.

WILLIAM S. DAVENPORT.

Witnesses:
R. A. BATES,
IRA L. FISH.